(12) United States Patent
Pfeffer et al.

(10) Patent No.: US 10,819,195 B2
(45) Date of Patent: Oct. 27, 2020

(54) DISCHARGE DEVICE

(71) Applicant: SCHUNK BAHN- UND INDUSTRIETECHNIK GMBH, Wettenberg (DE)

(72) Inventors: Daniel Pfeffer, Mücke (DE); Robert Noe' Castellanos, Gießen (DE)

(73) Assignee: Schunk Transit Systems GmbH, Wettenberg (DE)

( * ) Notice: Subject to any disclaimer, the term of this patent is extended or adjusted under 35 U.S.C. 154(b) by 475 days.

(21) Appl. No.: 15/566,102

(22) PCT Filed: Apr. 5, 2016

(86) PCT No.: PCT/EP2016/057396
§ 371 (c)(1),
(2) Date: Oct. 12, 2017

(87) PCT Pub. No.: WO2016/165973
PCT Pub. Date: Oct. 20, 2016

(65) Prior Publication Data
US 2018/0091027 A1   Mar. 29, 2018

(30) Foreign Application Priority Data
Apr. 13, 2015   (DE) .................. 10 2015 206 520

(51) Int. Cl.
*H02K 11/40* (2016.01)
*H01R 39/64* (2006.01)
(Continued)

(52) U.S. Cl.
CPC .......... *H02K 11/40* (2016.01); *H01R 39/022* (2013.01); *H01R 39/24* (2013.01); *H01R 39/64* (2013.01);
(Continued)

(58) Field of Classification Search
CPC ...... H02K 11/40; H01R 39/022; H01R 39/24; H01R 39/69
See application file for complete search history.

(56) References Cited

U.S. PATENT DOCUMENTS

| 7,193,836 B2 | 3/2007 | Oh et al. |
| 2006/0228923 A1* | 10/2006 | Swift ................. G03G 21/20 439/179 |
| 2010/0187946 A1 | 7/2010 | Orlowski et al. |

FOREIGN PATENT DOCUMENTS

| CN | 2669457 Y | 1/2005 |
| CN | 101699720 A | 4/2010 |

(Continued)

OTHER PUBLICATIONS

The International Search Report and Written Opinion as dated Jul. 4, 2016 for International Application No. PCT/EP2016/057396.
(Continued)

*Primary Examiner* — Scott Bauer
(74) *Attorney, Agent, or Firm* — Quarles & Brady LLP

(57) ABSTRACT

The invention relates to a discharge device (10) for discharging electro-static charges from a shaft (39), comprising an annular holder (11) and a conductor arrangement (12), said conductor arrangement comprising at least one flexurally elastic conductor (13) arranged on the holder, said conductor being made of a carbon fiber arrangement, each end of the conductor being accommodated in the holder, said conductor arrangement comprising at least two conductor portions (33) extending transversely to a longitudinal shaft axis (32), said conductor portions each comprising a shaft contact portion (34) which together form a contact arrangement for being contacted with two circumferential contact areas of a shaft circumference (35), which are arranged in a shaft contact plane W, in such a manner that the shaft contact (Continued)

portions are arranged tangentially to the shaft circumference upon contact to the shaft circumference.

15 Claims, 2 Drawing Sheets

(51) Int. Cl.
*H01R 39/24* (2006.01)
*H01R 39/02* (2006.01)
*H05F 3/00* (2006.01)
*H01R 13/648* (2006.01)
*H01R 39/32* (2006.01)

(52) U.S. Cl.
CPC .......... *H05F 3/00* (2013.01); *H01R 13/6485* (2013.01); *H01R 39/32* (2013.01)

(56) References Cited

FOREIGN PATENT DOCUMENTS

| | | |
|---|---|---|
| DE | 1 132 231 B | 12/1957 |
| DE | 1 788 100 U | 7/1958 |
| DE | 10 2009 004060 A1 | 7/2010 |
| DE | 20 2011 106899 U1 | 11/2011 |
| EP | 1 736 621 A1 | 12/2006 |
| WO | 2015/032989 A2 | 3/2015 |

OTHER PUBLICATIONS

The Patent Office of the People's Republic of China, First Office Action and Search Report, Application No. 201680020337.6, dated Nov. 15, 2018, 9 pages [English Language Translation Only].
WIPO, English Translation of International Preliminary Report on Patentability, dated Oct. 26, 2017.

* cited by examiner

DISCHARGE DEVICE

CROSS-REFERENCE TO RELATED APPLICATIONS

This application represents the national stage entry of PCT International Application No. PCT/EP2016/057396 filed on Apr. 5, 2016 and claims priority to German Patent Application No. 10 2015 206 520.0 filed on Apr. 13, 2015. The contents of these applications are hereby incorporated by reference as if set forth in their entirety herein.

The invention relates to a discharge device for discharging electrostatic charges from a shaft, comprising an annular holder and a conductor arrangement which comprises at least one flexurally elastic conductor arranged on the holder.

In particular when discharging electrostatic charges from shafts having comparatively large diameters, annular discharge devices are generally used. The annular discharge devices known from the state of the art circumferentially surround a shaft, carbon fibers being arranged, for example in bundles, on the discharge device and brushing along a circumference of the rotating shaft with their fine ends and thus electrically contacting the shaft.

From U.S. Pat. No. 7,193,836, a discharge device for discharging electrostatic charges from a shaft is known in which a carbon fiber arrangement made of a plurality of filaments is arranged on a holder, which is annular and arranged coaxially to the shaft. To form a physical contact with the shaft, shaft contact portions of the individual filaments are oriented normal to the shaft circumference. Physical contact between the filaments and the shaft circumference thus only occurs at the axial ends of the filaments. Due to the normal arrangement of the filaments to the shaft circumference, the filaments are inclined in the respective rotating direction of the shaft. The filaments are inclined in the opposite direction in particular when the rotating direction of the shaft is changed.

This leads to the filaments possibly breaking and the carbon fiber arrangement splaying when the rotating direction is often changed. An electric contact of the shaft is no longer ensured in the desired manner.

The object of the present invention is to propose a discharge device which enables securely contacting a comparatively large shaft circumference independently of the rotating direction.

The object is attained by a discharge device having the features of claim 1.

The discharge device according to the invention for discharging electrostatic charges from a shaft comprises an annular holder and a conductor arrangement which comprises at least one flexurally elastic conductor arranged on the holder, said conductor being made of a carbon fiber arrangement, each end of the conductor being accommodated in the holder, said conductor arrangement comprising at least two conductor portions extending transversely to a longitudinal shaft axis, said conductor portions each comprising a shaft contact portion which together form a contact arrangement so as to be contacted to two circumferential contact areas of a shaft circumference, which are arranged in a shaft contact plane W, in such a manner that the shaft contact portions are arranged tangentially to the shaft circumference upon contact to the shaft circumference.

The discharge device is realized independently of the rotating direction due to the at least double design of the shaft contact portions tangentially abutting against the shaft circumference on circumferential contact areas of the shaft circumference. Carbon fibers of the carbon fiber arrangement do not have a free end which would be contacted to the shaft circumference. The conductor is rather arranged on the annular holder such that the conductor extends tangentially to the shaft circumference like a kind of tangent line to circles. In particular by both ends being accommodated in the holder, it can also be prevented that the conductor orients itself in the direction of a rotating direction with an end. A movement of the conductor which is independent to the rotating direction as well as an end splaying is thus prevented. Nevertheless, the conductor is flexurally elastic and can shape itself to the shaft circumference, whereby a reliable contact and simultaneously a longer service life of the discharge device are made possible.

In one embodiment of the discharge device, the conductor portions can be connected to each other via the conductor. A conductor can then form two or more conductor portions, for example. The conductor can then be fastened to the annular holder in such a manner that the conductor is contacted to the shaft circumference only in certain sections or to the conductor portions. Thus, the discharge device can also then comprise an individual conductor by itself, which significantly simplifies a possible replacement of the conductor. It is also conceivable that the discharge device comprises multiple conductors having two or more conductor portions each.

In another embodiment, the conductor portions can each be formed by a conductor. In this case, each of the at least two conductor portions are formed by their own conductor. If a conductor portion has to be renewed, then not all conductor portions have to be replaced.

The ends of the conductor can each be accommodated in an anchor bearing of the holder. For this purpose, the ends can then be firmly fixed to the respective anchor bearing.

At least one anchor bearing can be realized such that the end is fixed in the anchor bearing by clamps. This can be carried out in particular by clamping the conductor by means of a screw. Optionally, the conductor can be fixed to the holder via clamps using a wedge or a collet. This makes it possible to adjust a length of the conductor to the shaft circumference.

A first end of the conductor can be fastened to a pre-tensioning anchor and a second end of the conductor can be fastened to a dead-end anchor of the holder in such a manner that a pre-tension can be realized in the conductor in the longitudinal direction. Optionally, it is of course also possible to span the conductor between to pre-tensioning anchors. The dead-end anchor can be realized by, for example, making an end of the conductor thicker than the conductor portion. The end can then be simply fastened to the dead-end anchor in a form-fitting manner, for example by being hooked. After fastening the conductor to the dead-end anchor, a tension force can be exerted on the conductor, wherein the conductor or rather the first end can be clamped in the pre-tensioning anchor, for example. A pre-tension can thus also be formed in the conductor. If the conductors are arranged on the annular holder so that conductor portions, which are arranged opposite each other, have a shorter relative distance than a shaft diameter, a spring force can act from the conductors or the conductor portions, respectively, on the shaft circumference in the area of the shaft contact portion or the conductor portions, respectively, whereby a particularly secure contacting of the shaft circumference is possible.

Alternatively, a first end of the conductor can be fastened to a displaceable anchor and a second end of the conductor can be fastened to a deadend anchor of the holder in such a manner that the conductor can be moved in the longitudinal direction. The displaceable anchor can be a simple bore in the holder, for example, in which the conductor is loosely placed or inserted. The conductor can then be moved in its longitudinal direction. If the conductor is at least partially flexurally resistant, for example by providing the conductor with a coating of pyrolytically deposited carbon, the conductor can exert a spring force on the shaft and is mostly flexible by being able to be moved in the displaceable anchor. The anchor can then also be replaced particularly easily.

In order to simplify fixing or mounting the conductor to the annular holder, an end of the conductor can be cased with a rope socket. Both ends of the conductor can preferably be cased with a rope socket each. The rope socket can clamp the carbon fibers of the conductor to the ends. The socket rope can also serve for easily fastening the conductor to the holder in a form-fitting manner. A bore can thus be provided on the holder through which the conductor but not the rope socket can be guided.

Two, preferably three, particularly preferably four or more, conductor portions can be formed for contacting circumferential contact areas arranged at an equal distance to each other in a circumferential direction in the shaft contact plane W. When three conductor portions are formed, for example, a central angle can be 120° from one conductor portion to each adjacent conductor portion relative to a shaft axis. It can then also always be ensured that the discharge device is coaxially arranged to the shaft circumference. Mounting the discharge device to the shaft circumference is then significantly simplified since the discharge device centers itself.

The conductor portion can extend through a straight guide channel formed in the holder, a channel diameter being able to be larger than a conductor diameter. The guide channel can be a simple bore which extends through the annular holder, which can consist of aluminum or another suitable metal, for example, like a chord. In this context, the annular holder can be an annulus. The guide channel can exit from an inner annulus diameter and enter it again so that the guide channel extends through two portions of the annulus. The guide channel, however, can also be a groove which is milled in the annulus, said groove being able to interrupt at least certain sections of the annulus such that the conductor spans through an inner diameter of the annulus and forms the conductor portion there. If the channel diameter is larger than a conductor diameter, the conductor can be inserted particularly easily into the guide channel and flexibly move there if necessary.

The holder can be realized particularly easily if it is realized as a one-piece ring. A one-piece ring or rather an annulus can be easily produced via rotation. Such a holder is particularly suitable for being mounted on free shaft ends.

Optionally, the holder can be formed as a multipart ring made of ring segments, which are connected to each other. In particular when shaft portions are closed, it becomes possible to mount an annular holder. The multipart ring can be formed by ring halves, ring thirds, ring quarters, etc., depending on the number of conductor portions. These ring segments can be directly connected to each other by means of screw or rivet connections. It is also possible to mount the ring segments directly to, for example, an anchor chair without an indirect connection and to thus form the annular holder. Electrostatic charges can then be discharged directly from the holder to the anchor chair.

The holder can, however, also be formed as a housing cover or be connected to a housing cover. This is particularly advantageous for practical use of the discharge device as well as for reducing a maintenance effort in conjunction with exchanging a conductor of the discharge device.

The carbon fiber arrangement of the conductor can comprise a fiber network which is provided with a coating made of pyrolytically deposited carbon so that the coating made pyrolytic carbon serves not only to densify the contact surface of the conductor but to also form a casing, which supports the fiber network and provides the desired flexurally elastic properties of the conductor in conjunction with the fiber network, said conductor having a flexural rigidity which can be influenced in particular by the thickness of the coating.

Forming the coating using a CVI method (chemical vapor infiltration) has proven to be particularly advantageous since this method provides not only the desired surface coating but also the forming of binding forces between individual filaments of the fiber network.

It has proven particularly advantageous if the fiber network is made of envelopes of a unidirectional fiber network, which extends in the longitudinal direction of the conductor and comprises filaments which are essentially parallel to each other, so that capillaries are formed via the spaces between the fibers and enable advantageously using capillary effects for removing grease or humidity from the shaft circumference.

In order to increase the flexural rigidity of the conductor, it is advantageous if the fiber network is provided with a resin matrix.

In the following, an advantageous embodiment of the invention is further described by means of the drawings.

Figure 1:
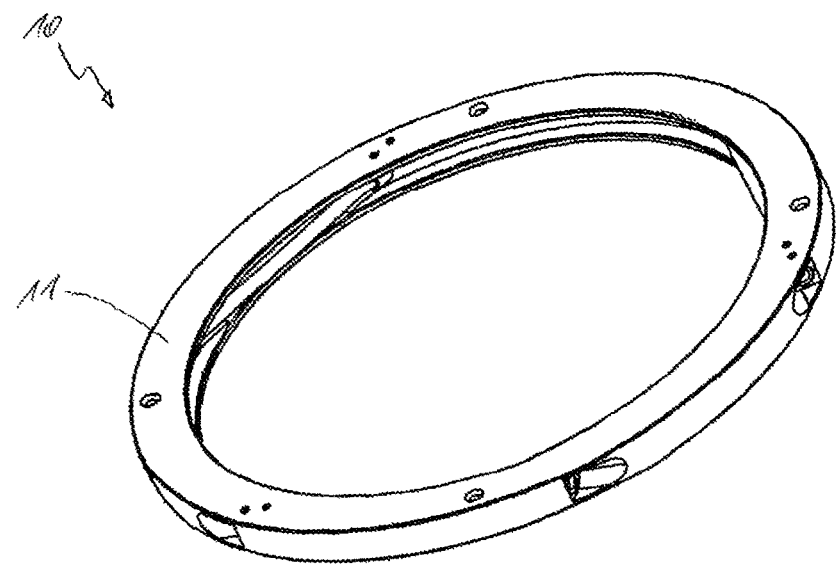
FIG. 1 shows a perspective view of a discharge device.
Figures 2, 3:
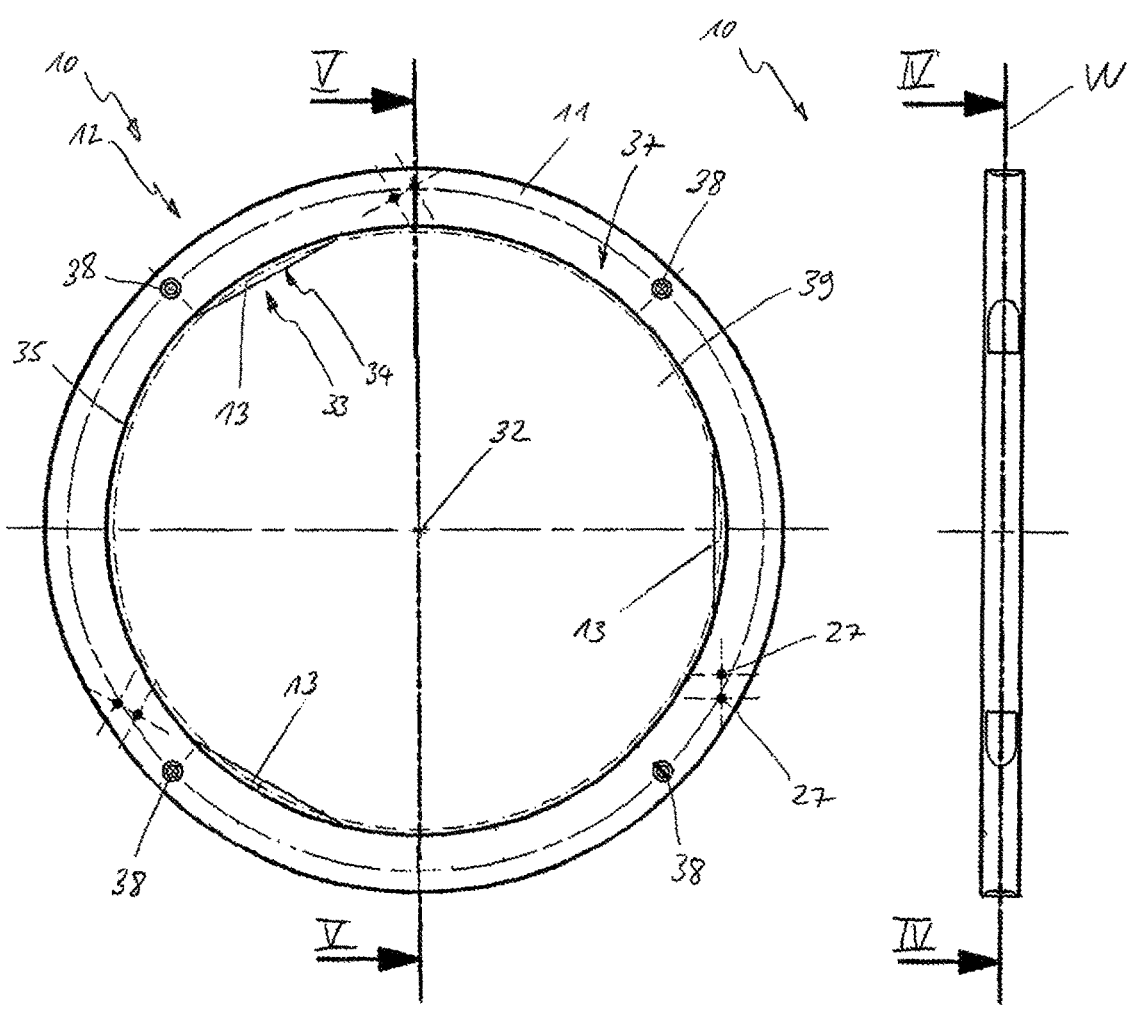
FIG. 2 shows a front view of the discharge device.
FIG. 3 shows a left side view of the discharge device.
Figure 4:
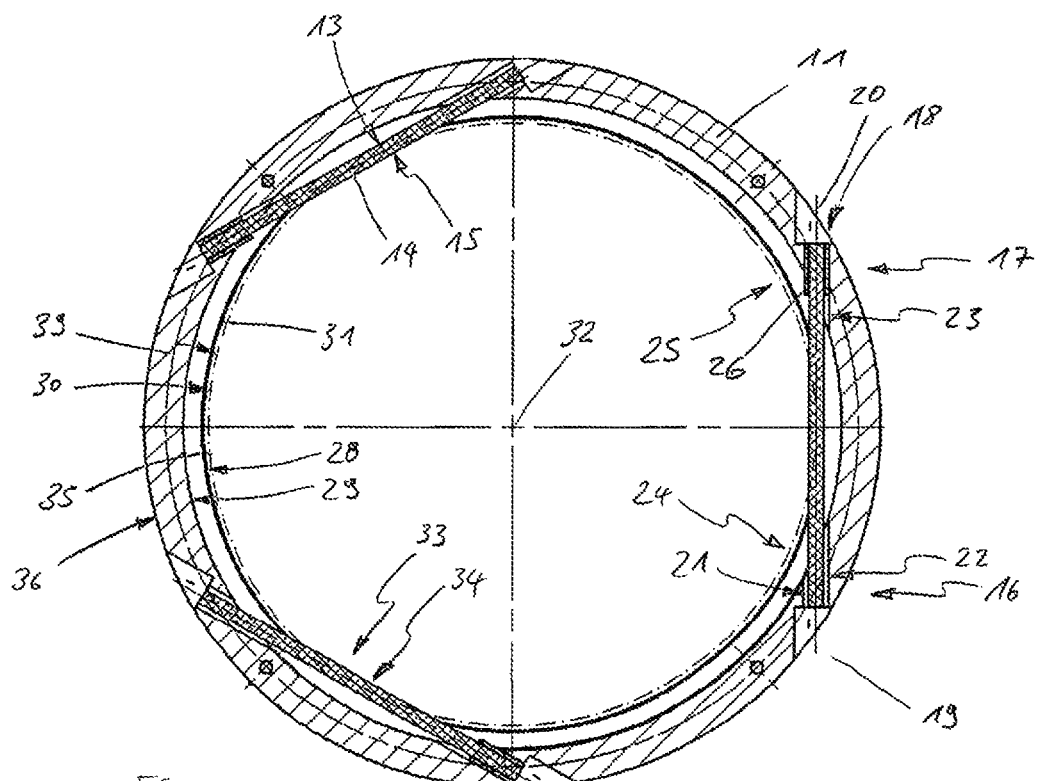
FIG. 4 shows the discharge device in a cross sectional view along a line IV-IV from FIG. 3.
Figure 5:
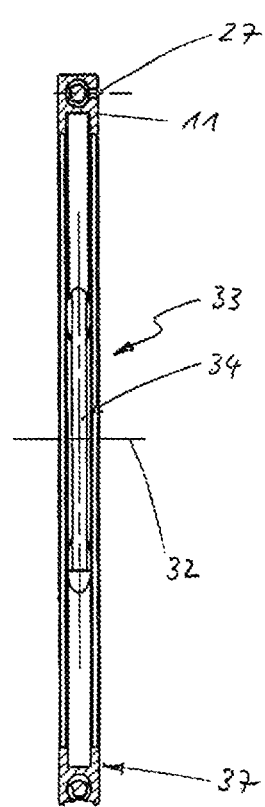
FIG. 5 shows the discharge device in a cross sectional view along a line V-V from FIG. 5.

A synopsis of FIGS. 1 to 5 shows a discharge device 10 which is formed by an annular holder 11 made of aluminum and a conductor arrangement 12. The conductor arrangement 12 comprises three flexurally elastic conductors 13. The conductors 13 are each made of carbon fibers 14 in a fiber network 15. The conductor 13 comprises a first end 16 and a second end 17. The conductor 13 is arranged in a straight guide channel 18 which is formed in the holder 11. The longitudinal axis 19 of the conductor 13 aligns flush with a channel axis 20 of the guide channel 18. The guide channel 18 is formed by a through bore 21, each having a first bore section 22 and a second bore section 23. The first bore section 22 forms a pre-tensioning anchor 24 and the second bore section 23 forms a dead-end anchor 25 for the conductor 13. A rope socket 26 is fixedly arranged or clamped, respectively, on the second end 17 of the conductor to 13, said rope socket 26 being fixed to the dead-end anchor 25 in a form-fitting manner. The first end 16 of the conductor 13 is fixed in the pre-tensioning anchor 24 by being clamped using two screws 27.

The holder 11 comprises a circumferential inner groove 29 on an inner diameter 28. The inner diameter 28 is slightly larger than a shaft diameter 30 of a shaft 39, which is only hinted at here. A crevice 31 is realized between the inner diameter 28 and the shaft diameter 30. The holder 11 is therefore arranged coaxially to a longitudinal shaft axis 32 when mounted. The conductor arrangement 12 or rather the conductors 13 thus form(s) conductor portions 33 which extend transversely to the longitudinal shaft axis 32. The conductor portions 33 each comprise a shaft contact area 34 which each form circumferential contact areas of a shaft circumference 35, said circumferential areas not illustrated here and said shaft circumference 35 only being hinted at. The shaft contact portions 34 extend in a shaft contact plane W, said shaft contact portions 34 being arranged tangentially to the shaft circumference 35 upon contact to the shaft circumference 35. In contrast to the straight orientation illustrated here, the conductors 13 can be deformed at least partially in a crescent shape along the longitudinal axis 19 and shape themselves to the shaft circumference 35 since the conductors 13 are flexurally elastic. The conductors 13 or rather the conductor portions 33 are each arranged at an equal distance to each other.

Individual conductors 13 can be easily exchanged by loosening the screws 27 and removing the conductor 13 from the through bore 21 on an outer diameter 36 of the holder 11. Four through bores 38 are provided in an annular surface 37 of the holder 11, said holder 11 or rather the discharge device 10, on an anchor chair for example, being able to be simply mounted to the anchor chair via screws.

The invention claimed is:

1. A discharge device for discharging electrostatic charges from a shaft, the discharge device comprising:
   an annular holder; and
   a conductor arrangement, said conductor arrangement comprising at least one flexurally elastic conductor arranged on the holder, and at least first and second conductor portions extending transversely to a longitudinal shaft axis, said first and second conductor portions each comprising a corresponding first and second shaft contact portion, wherein the first and second shaft contact portions together form a contact arrangement so as to be contacted with corresponding first and second circumferential contact areas of a shaft circumference arranged in a shaft contact plane W, wherein the first and second shaft contact portions are arranged tangentially to the shaft circumference upon contact to the shaft circumference; and
   wherein the conductor is made of a carbon fiber, and the conductor includes first and second ends, and each of the first and second ends of the conductor is accommodated in the holder, and wherein the carbon fiber arrangement of the conductor comprises a fiber network which is provided with a coating of pyrolytically deposited carbon.

2. The discharge device according to claim 1, wherein the first and second conductor portions are connected to each other via the conductor.

3. The discharge device according to claim 1, wherein the first and second conductor portions are each formed by a conductor.

4. The discharge device according to claim 1, wherein the first and second ends of the conductor are each accommodated in an anchor bearing of the holder.

5. The discharge device according to claim 4, wherein at least one anchor bearing comprises a clamp that couples at least one of the first and second ends of the conductor in the anchor bearing.

6. The discharge device according to claim 4, wherein at least one of the first and second ends of the conductor is fastened to a pre-tensioning anchor and a second one of the first and second ends of the conductor is fastened to a dead-end anchor to produce a pre-tension in the conductor in the longitudinal direction.

7. The discharge device according to claim 4, wherein at least one of the first and second ends of the conductor is fastened to a displaceable anchor and a second one of the first and second ends of the conductor is fastened to a dead-end anchor of the holder wherein the conductor can be moved in the longitudinal direction.

8. The discharge device according to claim 4, wherein at least one of the first and second ends of the conductor is cased with a rope socket.

9. The discharge device according to claim 1, wherein the at least first and second conductor portions are formed for contacting circumferential contact areas which are arranged at equal distances to each other in a circumferential direction in the shaft contact plane W.

10. The discharge device according to claim 1, wherein the conductor section extends through a straight guide channel formed in the holder, a channel diameter of the straight guide channel being larger than a conductor diameter.

11. The discharge device according to claim 1, wherein the holder is formed as a one-piece ring.

12. The discharge device according to claim 1, wherein the holder is formed as a multipart ring made of ring segments which are connected to each other.

13. The discharge device according to claim 1, wherein the holder is comprised of a housing cover or is connected to a housing cover.

14. The discharge device according to claim 1, wherein the fiber network comprises an envelope of a unidirectional fiber strand extending in the longitudinal direction of the conductor.

15. The discharge device according to claim 1 wherein the fiber network is provided with a resin matrix.

* * * * *